Patented Jan. 1, 1952

2,580,476

UNITED STATES PATENT OFFICE 2,580,476

SUBSTITUTED HETEROCYCLIC COMPOUNDS

James M. Sprague, Drexel Hill, and Anthony H. Land, Ridley Park, Pa.

No Drawing. Application October 10, 1947, Serial No. 779,212

6 Claims. (Cl. 260—302)

This invention relates to new thiazole derivatives, and in particular, to new 4-(mercaptomethyl) thiazoles.

Included among the compounds of the invention are the 2-amino, or substituted amino, 4-(mercaptomethyl) thiazoles which may be represented by the general formula

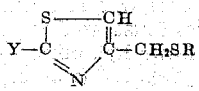

in which Y represents the amino group —$NH_2$ or a substituted amino group in which one or both of the hydrogens of the amino group is or are replaced by an alkyl, aralkyl, alicyclic or aryl group or groups or one is replaced by an acyl group, and in which R represents hydrogen, or an alkyl, alkenyl, aralkyl, aminoalkyl, carboxyalkyl, alkylcarboxyalkyl, cyanoalkyl group or other group; and others by the formula

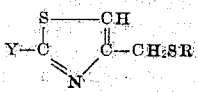

in which Y represents an amino or substituted amino group, hydrogen, alkyl, aralkyl, aryl or alicyclic group or substituted derivatives thereof and R represents the residue of an acid group, such as the acetic acid radical (—$CH_2COOH$), the ethyl acetate radical (—$CH_2COOC_2H_5$), the propionic acid (—$CH_2CH_2COOH$) or ethyl propionate radical (—$CH_2CH_2COOC_2H_5$), the propionitrile radical (—$CH_2CH_2CN$) or other acid or ester radical.

The compounds of the invention are useful as intermediates for the preparation of other compounds which may indicate varied application in therapeutic preparations, and some of these thiazoles indicate varied effectiveness as antithyroid agents.

The compounds of the invention are most conveniently prepared from the corresponding isothiourea salts, by treatment of the isothiourea compound with alkali, forming the mercaptan or mercaptide in solution, followed by alkylation, reaction with an unsaturated carbonyl compound, oxidation or other suitable treatment to convert the product to the desired derivative of the mercaptan. Thus, the thioethers are readily prepared by treatment of the isothiourea salt with alkali to produce the mercaptan in solution, followed by treatment with an alkylating agent such as methyl sulfate, ethyl bromide or the like, the acid derivatives by treatment of the mercaptan in solution with chloroacetic acid, ethyl chloroacetate, ethyl acrylate, ethyl methacrylate, acrylonitrile or the like.

The isothiourea salts which are used as intermediates for the preparation of the compounds of the application may be conveniently prepared by direct reaction of the corresponding 4-chloromethylthiazole with thiourea in an inert solvent. This reaction proceeds readily and gives the isothiourea in the form of the hydrochloride directly. These isothioureas are not stable except in the form of their salts, decomposing under alkaline conditions to the mercaptan and cyanamide, and when they are used for the preparation of the products of this invention, isolation of the mercaptan is not necessary, all that is required being the treatment of the isothiourea salt solution with alkali to form the mercaptan, and the use of this solution for the production of the desired compound.

These methods of preparing the new compounds of the invention will be illustrated in the following examples, but the invention is not limited thereto. All parts are by weight.

*Example 1.—2-methyl-4-thiazolylmethylmercaptoacetic acid.*—4.7 parts of 2-methyl-4-chloromethylthiazole in 12 parts of ethanol were added to a solution of 2.45 parts of thiourea in 60 parts of warm ethanol and the mixture was refluxed for 2 hours. The ethanol was then evaporated and the viscous liquid residue was cooled and stirred until it crystallized. It was recrystallized from a mixture of ethyl and isopropyl alcohols containing a few drops of concentrated hydrochloric acid, giving S-(2-methyl-4-thiazolylmethyl)-isothiourea hydrochloride. To 1.68 parts of this salt dissolved in 20 parts of 4% aqueous sodium hydroxide were added 1.45 parts of chloroacetic acid. After one hour a drop of the solution gave no violet color with alkaline sodium nitroprusside solution, indicating the absence of mercaptan. Acidification with hydrochloric acid precipitated an oil that soon crystallized. After washing with water and drying, the product melted at 104.5–105.5° C. Two recrystallizations from water containing a little ethanol did not change the melting point.

*Example 2.—2-phenyl-4-thiazolylmethylmercaptoacetic acid.*—To a suspension of 7 parts of S-(2-phenyl-4-thiazolylmethyl)-isothiourea hydrochloride, prepared from 2-phenyl-4-chloromethylthiazole and thiourea, in 25 parts of water were added 15 parts of 20% aqueous caustic soda, and 2.5 parts of chloroacetic acid. After one hour a little filter aid was added and after 5 minutes on a steam bath, the mixture was filtered. The solid that precipitated from the filtrate on acidification with hydrochloric acid was washed with water, dissolved in saturated aqueous sodium bicarbonate and the solution was filtered. Acidification of the filtrate precipitated an oil that solidified on standing and which after washing with water and drying melted at 75–77° C. Two recrystallizations from a mixture of benzene and hexane raised the melting point to 78–79° C.

*Example 3. — S-(2-amino-4-thiazolylmethyl)-beta-mercaptopropionitrile.*—0.8 part of acrylonitrile was added to a solution of 2.61 parts of S - (2-amino-4-thiazolylmethyl)-isothiourea hydrochloride, obtained from 2-amino-4-chloromethyl-thiazole and thiourea, in 6 parts of 20% of sodium hydroxide and 10 parts of water. The solution became turbid immediately and within a minute a solid had separated. After 2 more minutes the solid was collected on a filter, washed with water and recrystallized from water. The white needles obtained melted at 110–111° C. Further recrystallization did not raise the melting point.

*Example 4. — Ethyl S - (2 - amino-4-thiazolylmethyl)-beta-mercaptopropionate.* — Substitution of 1.1 parts of ethyl acrylate for the acrylonitrile in the procedure described in the preceding example gave this ester, which on recrystallization from a benzene-hexane mixture had a melting point of 74.5–75.5° C.

*Example 5. — 2 - amino - 4 - methylmercaptomethylthiazole.*—13.05 parts of S-(2-amino-4-thiazolylmethyl)-isothiourea hydrochloride were dissolved in 40 parts of 20% sodium hydroxide solution, cooled in an ice bath and stirred in an atmosphere of nitrogen while 6.5 parts of methylsulfate were added. The mixture was allowed to stand overnight and the solid was collected on a filter and washed with water. It was then extracted with 50 parts of boiling benzene, the resulting solution was filtered and the filtrate diluted with hexane to precipitate the product. It was obtained in the form of white crystals, M. P. 76.5–78° C. Recrystallization from a benzene-hexane mixture raised the melting point from 79.5 to 80.5° C.

*Example 6.—2-amino-4-ethylmercaptomethylthiazole.*—A solution of 6.5 parts of S-(2-amino-4-thiazolylmethyl)-isothiourea hydrochloride and 4.5 parts of ethyl bromide in 32 parts of ethanol was stirred in an atmosphere of nitrogen while 40 parts of 10% aqueous sodium hydroxide were added rapidly. After 15 minutes the solution was poured into a dish and heated on a steam bath in an air blast until most of the alcohol had evaporated. The oil which precipitated solidified upon cooling was collected on a filter, washed with water and dried at 70° C. It melted at 89–93° C. It was dissolved in 15 parts of hot alcohol, filtered, heated to the boiling point and diluted with water until the cloudiness barely disappeared upon reheating to boiling. Upon cooling, the solution deposited an oil which solidified to a mass of white plates, M. P. 93–94° C. On recrystallization, the product melted at 93.5–95° C.

*Example 7. — S-(2-amino-4-thiazolylmethyl)-thioglycolic acid.*—2.6 parts of S-(2-amino-4-thiazolylmethyl)-isothiourea hydrochloride and one part of chloroacetic acid were dissolved in 10 parts of water and 8 parts of a 20% caustic soda solution. After an hour on the steam bath the solution gave a negative test with nitroprusside. It was then acidified with hydrochloric acid to about pH 4 and cooled. The crystalline solid was collected on a filter and a second crop obtained by cautiously adding hydrochloric acid to the filtrate until the precipitate just began to redissolve. The two lots were combined and recrystallized from water giving a product in the form of light yellow crystals, M. P. 166–168° C.

17.4 parts of this product were dissolved in 50 parts of 10% (weight per weight) ethanolic hydrogen chloride. The solution became warm and set to a stiff paste or crystals. After standing over-night the suspension was refluxed for 2 hours during which time the solid dissolved. The alcohol was evaporated and the solid stirred to a paste in 75 parts of water. An excess of 20% sodium hydroxide was added, causing the precipitate to change in appearance without dissolving. The solid was dissolved by shaking the suspension with ethyl ether. The ether solution was evaporated after having been dried with anhydrous sodium sulfate and the oily residue stirred with a little hexane until it crystallized. After collection on a filter the crude ethyl ester melted at 64–67° C. Recrystallization from benzene-hexane gave a product melting at 66.5–68.5° C. and another recrystallization raised the melting point to 68–69° C.

Other compounds which are included within the scope of the invention, and are readily prepared by the procedures illustrated by the foregoing examples include 2-methylamino-4-ethylmercaptomethylthiazole, prepared from ethyl bromide and 2 - methylamino - 4 - chloromethylthiazole; 2-phenylamino - 4 - benzylmercaptomethylthiazole, prepared from benzyl chloride and 2-phenylamino-4-chloromethylthiazole; 2-benzylamino-4-cyclohexylmercaptomethylthiazole, prepared from cyclohexylbromide and 2-benzylamino-4-chloromethylthiazole; 2-dimethylamino-4 - propylmercaptomethylthiazole, prepared from propyl bromide and 2-dimethylamino-4-chloro-methylthiazole; 2-diethylamino - 4 - aminoethylmercaptomethylthiazole prepared from chloroethylamine and 2 - diethylamino-4-chloromethylthiazole; 2-cyclohexylamino - 4 - ethylmercaptomethylthiazole, prepared from ethyl bromide and 2-cyclohexylamino - 4 - chloromethylthiazole; 2-acetoamino - 4 - methylmercaptomethylthiazole, prepared from methylsulfate and 2-acetoamino-4-chloromethylthiazole; 2 - (3,4-methylenedioxyphenyl)-4-thiazolylmethylthioglycolic acid, prepared from chloroacetic acid and 2-(3,4-methylenedioxyphenyl)-4 - chloromethylthiazole; S-[2-(4 - methoxyphenyl)-4-thiazolylmethyl] - beta-mercaptopropionitrile, prepared from acrylonitrile and 2-(4-methoxyphenyl)-4-chloromethylthiazole; 2 - phthalimidomethyl - 4 - thiazolylmethylmercaptoacetic acid, prepared from chloroacetic acid and 2 - phthalimidomethyl-4-chloromethylthiazole. In each case, of course, the chloromethylthiazole is converted to the isothiourea salt by reaction with thiourea in an inert solvent, the salt is treated with alkali, and the resulting mixture, without isolation of the mercaptan, or mercaptide, is reacted with the alkylating or other agent.

We claim:

1. Compounds of the formula

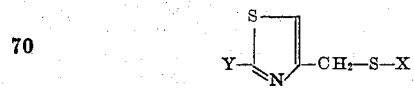

wherein Y is a member of the group consisting of alkyl, aryl and amino radicals; and X is a member of the group consisting of alkyl, an alkyl group substituted by a group selected from the carboxyl, carbalkoxy and the nitrile radicals, and aralkyl radicals.

2. S-(2-amino-4-thiazolylmethyl)-beta-mercaptopropionitrile.

3. 2-amino-4-methylmercaptomethylthiazole.

4. S-(2-amino-4-thiazolylmethyl)-thioglycolic acid.

5. 2-methyl-4-thiazolylmethylmercaptoacetic acid.

6. 2-phenyl-4-thiazolylmethylmercaptoacetic acid.

JAMES M. SPRAGUE.
ANTHONY H. LAND.

REFERENCES CITED

The following references are of record in the file of this patent:

Land et al.: J. Am. Chem. Soc., vol. 68, pp. 2155–2159 (1946).